(12) United States Patent
Negishi et al.

(10) Patent No.: US 6,567,614 B1
(45) Date of Patent: May 20, 2003

(54) CAMERA CASING AND RECYCLING METHOD THEREFOR

(75) Inventors: Kenji Negishi, Kanagawa (JP); Keiji Uchiyama, Kanagawa (JP); Mitsuro Kamata, Kanagawa (JP); Toshio Sata, deceased, late of Kanagawa (JP), by Machiko Sata, Kazuyoshi Sata, Akio Sata, legal representatives

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/762,187

(22) PCT Filed: Jun. 1, 2000

(86) PCT No.: PCT/JP00/03537

§ 371 (c)(1),
(2), (4) Date: Apr. 11, 2001

(87) PCT Pub. No.: WO00/75726

PCT Pub. Date: Dec. 14, 2000

(30) Foreign Application Priority Data

Jun. 4, 1999 (JP) .......................................... 11-158736

(51) Int. Cl.[7] .............................................. G03B 17/02
(52) U.S. Cl. ............................................ 396/6; 396/25
(58) Field of Search ................................ 396/6, 27, 29, 396/25

(56) References Cited

U.S. PATENT DOCUMENTS

| 4,882,600 | A | * | 11/1989 | Van de Moere | 396/29 |
| 5,325,139 | A | * | 6/1994 | Matsumoto | 396/27 |
| 5,576,781 | A | * | 11/1996 | Deleeuw | 396/14 |
| 5,729,769 | A | * | 3/1998 | Rydelek | 396/29 |
| 5,897,225 | A | * | 4/1999 | Rieger et al. | 396/29 |

FOREIGN PATENT DOCUMENTS

| JP | 10-3113 | 1/1998 |
| JP | 10-3114 | 1/1998 |
| JP | 11-109468 | 4/1999 |
| JP | 11-174561 | 7/1999 |

* cited by examiner

*Primary Examiner*—Alan A. Mathews
*Assistant Examiner*—D. Ben Esplin
(74) *Attorney, Agent, or Firm*—Young & Thompson

(57) ABSTRACT

A camera casing of the present invention is an integral two-color molded product whose case main body (32) consists of a transparent rigid resin layer (32a) and an opaque rigid resin layer (32b). Essential parts of the camera are exposed through the transparent resin layer (32a), so the camera may be operated from outside the casing. The casing is collected and melted as a whole without discriminating between the transparent rigid resin and the opaque rigid resin, to be recycled as a material for the opaque resin layer (32b) when the case main body is newly formed by two-color injection molding.

6 Claims, 4 Drawing Sheets

CAMERA CASING AND RECYCLING METHOD THEREFOR

FIELD OF THE ART

The present invention relates to a camera casing and a recycling method therefor.

BACKGROUND ART

Lens-fitted photo film units is a kind of handy economical camera that is preloaded with photo film before it is brought into the market. Because of their handiness and cheapness, the lens-fitted photo film units are widely used by many people. There are a variety of lens-fitted photo film units for respective photographic purposes and applications. Many types of waterproof lens-fitted photo film units have also been developed, and make it possible to photograph in water. The waterproof lens-fitted photo film unit encases a film unit body in a plastic waterproof casing that is structured to be watertight, and permits a film winding operation, a shutter release operation and other operation on the film unit body from outside the waterproof casing.

Since the waterproof casing weights on waterproof properties among all, there are many restrictions on design, so the appearance tends to be monotone. Efforts for avoiding monotony have conventionally been done by putting a bright colored sheet as an accent around the film unit body, or by providing a paper box of the film unit body with ornamental printing, before the film unit body is contained in the waterproof casing. However, unlike other ordinary types of lens-fitted photo film unit, it has been difficult to provide a waterproof lens-fitted photo film unit with a superior prominent design, or with preferable colors for users while maintaining the low cost.

To solve this problem, Japanese Laid-open Patent Application Nos. 10-3113 and 10-3114 disclose waterproof casings, wherein a colored elastomer waterproof cover is formed integrally with a transparent plastic case main body by two-color injection molding. The waterproof cover not only provides an appropriate waterproof properties, but also improves the design the waterproof casing by constituting it of transparent portions and colored portions, and thereby makes the waterproof lens-fitted photo film unit conspicuous as an article.

Japanese Laid-open Patent Application No. 11-174561 discloses a lens-fitted photo film unit that uses a casing formed from a rigid plastic and an elastomer by two-color molding. Japanese Laid-open Patent Application No. 11-109468 discloses a waterproof lens-fitted photo film unit whose waterproof casing is formed from a rigid transparent plastic, a rigid opaque plastic and an elastomer by three-color molding.

In recent years, it becomes a common sense that recycling of resources is especially important for global environmental protection. As for used lens-fitted photo film units, since they are to be submitted to photofinishers for development without the photo film being removed from the casing, a system has been developed for recycling most parts of the lens-fitted photo film unit after the photo film is removed.

However, from those casings which are formed integrally from different resin materials with largely different material structures, like the above mentioned one consisting of a rigid resin and an elastomer, original materials cannot be recovered. So it is impossible to reuse them for the same articles. Since reusable range of such casings is limited, their unit price as recycled material is very cheap. As a result, recycling cost of these kinds of casings are expensive.

The present invention is made to solve the above problems, and has an object to provide a camera casing that is good for recycling, and a recycling method that makes it possible to recycle casings efficiently at a low cost.

DISCLOSURE OF THE INVENTION

According to the present invention, a casing for a camera that contains the camera and allows to operate the camera from outside the casing is characterized in that the casing consists of transparent portions located in front of at least those parts of the camera which need to be exposed to external light and opaque or semi-transparent portions covering other parts of the camera, and that the transparent portions and the opaque or semi-transparent portions are formed respectively from a transparent rigid resin and an opaque or semi-transparent rigid resin by two-color injection molding. The transparent rigid resin and the opaque or semi-transparent rigid resin preferably have equal or similar physical and chemical properties to each other.

Unlike the conventional two-color forming products that consist of a rigid resin and an elastomer, the casing formed from two kinds of rigid resins by two-color injection molding makes it possible to reuse the casing as a material for reproducing the same casing while maintaining the advantage on design that the casing consists of transparent portions and bright-colored portions. That is, the casing of the present invention can be reproduced as the same product, so it makes it possible to establish a closed recycling system, and is superior in terms of recycling.

According to a recycling method for a camera casing that is formed from a transparent rigid resin and an opaque or semi-transparent rigid resin by two-color injection molding, the casing after collected is melted without distinguishing the transparent rigid resin from the opaque or semi-transparent rigid resin, to be reproduced as an opaque or semi-transparent resin, and the reproduced opaque or semi-transparent resin material is used as a material for forming the same casing newly by two-color injection molding.

It is preferable to add pigments, dyes or a transparent rigid resin to the reproduced material, for adjusting color density thereof, or add an elastic material to the reproduced material, for increasing the elasticity thereof.

The recycling method of the present invention contributes to saving labor, time and cost for recycling the casing so much that the efficiency of recycling is improved.

PREFERRED EMBODIMENTS OF THE INVENTION

Figure 1:
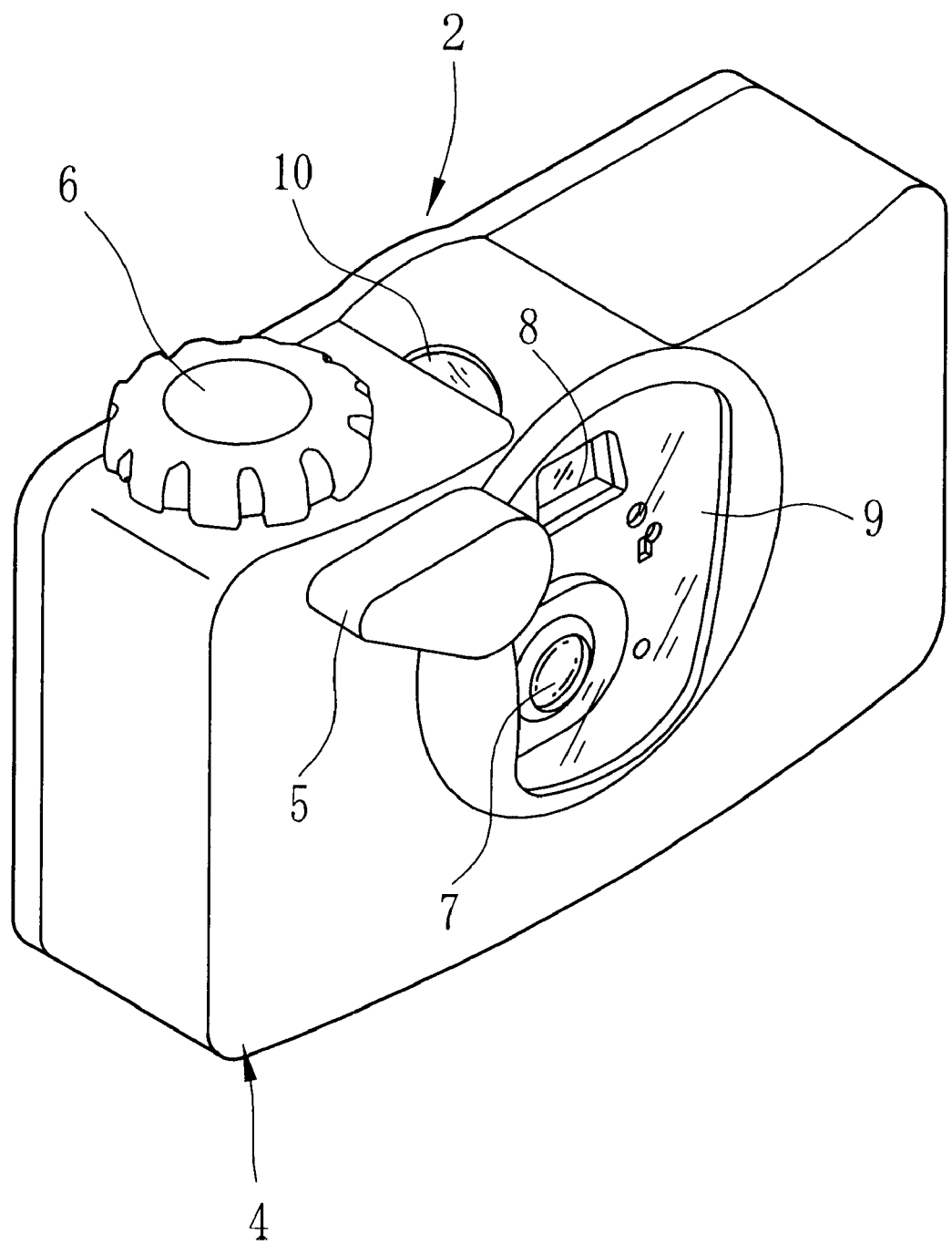
FIG. 1 is a perspective view of a casing of a waterproof lens-fitted photo film unit according to an embodiment of the present invention.

The present invention will now be described on the basis of an embodiment applied to a waterproof casing of a waterproof lens-fitted photo film unit. FIG. 1 is a perspective view illustrating an appearance of a waterproof lens-fitted photo film unit 2. The waterproof lens-fitted photo film unit 2 consists of a film unit body 3 and a waterproof casing 4 that contains the film unit body 3 in a watertight fashion. A shutter lever 5 for shutter-releasing is mounted on a front side of the casing 4, and a winding knob 6 for winding up a photo filmstrip after exposure is mounted on a top side of the casing. A photographic window 9 made of a transparent plastic is provided on the front side of the casing 4, for exposing a taking lens 7 and a finder objective window 8 of the film unit body 3 to outside. A look-in window 10 made of the transparent plastic is provided on the top side of the casing 4.

Figure 2:
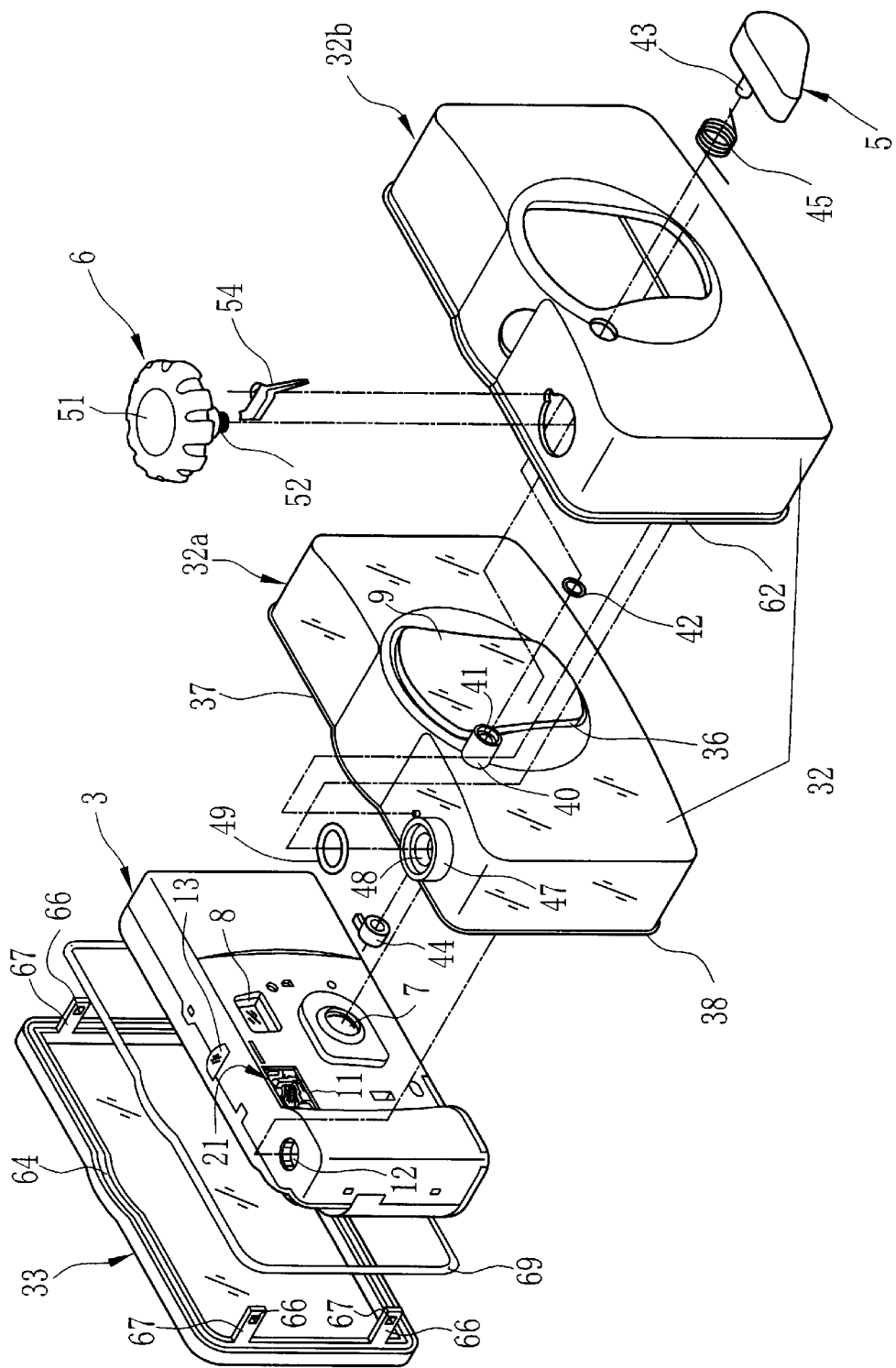
FIG. 2 is an exploded perspective view of the casing of the waterproof lens-fitted photo film unit of FIG. 1.
Figure 3:
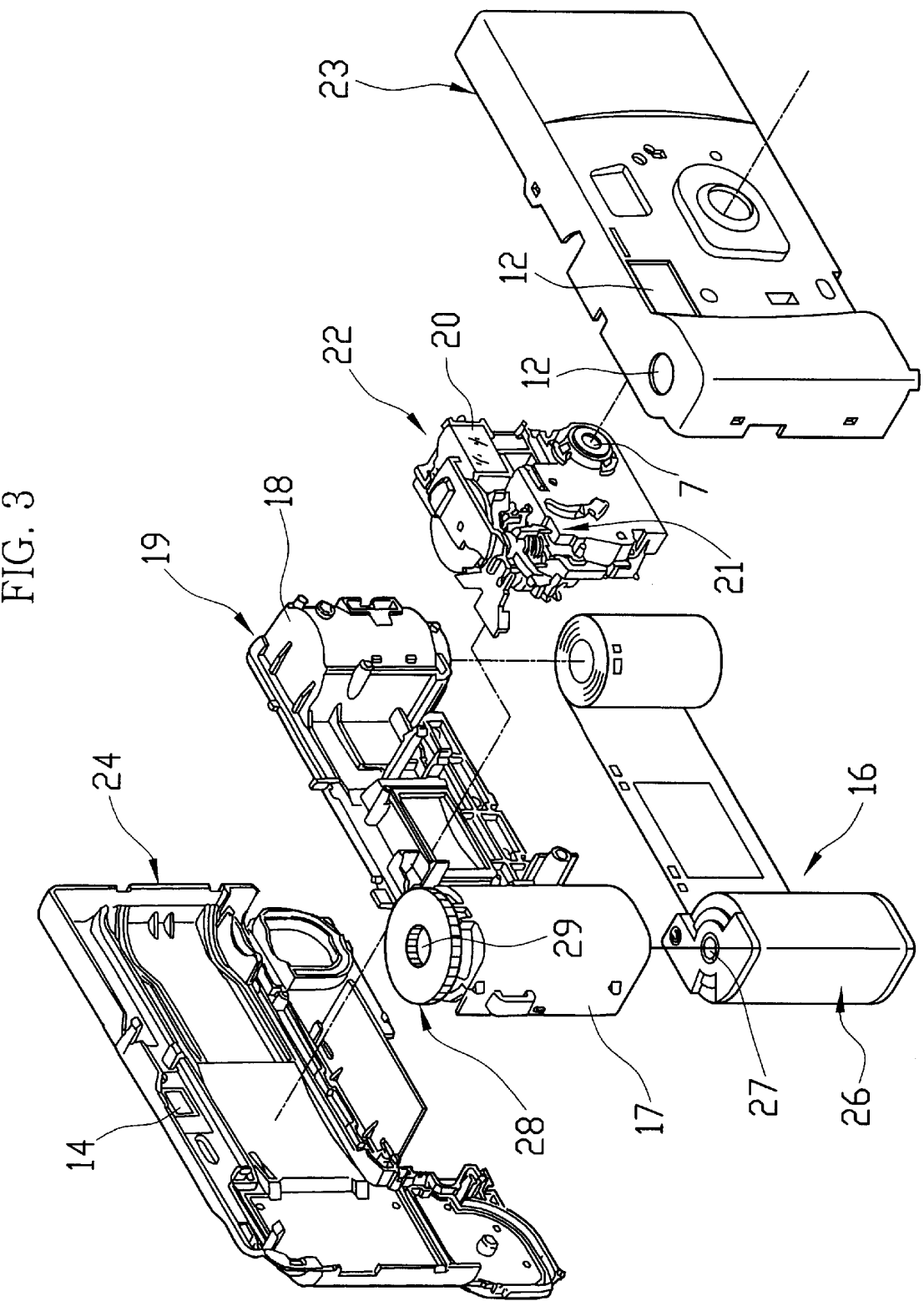
FIG. 3 is an exploded perspective view of a film unit body of the waterproof casing of FIG. 1.

As shown in FIG. 2, the film unit body 3 used in the waterproof type lens-fitted photo film unit 2 is formed with the taking lens 7, the finder objective window 8 and an opening 11 for the shutter lever on its front side, and has on its top side an opening 12 for the winding knob, and a frame counter window 13 for showing the remaining number of frames available for exposure. The frame counter window 13 can be observed through the look-in window 10 of the casing 4. As shown in FIG. 3, a finder eyepiece window 14 is provided on a rear side of the film unit body 3. The film unit body 3 is constituted of a body basic portion 19 having a cartridge chamber 17 and a film roll chamber 18 formed integrally therewith, in which an unused photo film cartridge 16 is loaded; an exposure unit 22 mounted to the front of the body basic portion 19 and having the taking lens 7, a finder optical system 20, a shutter mechanism 21, a film winding stop mechanism, a frame counter mechanism and other elements incorporated thereinto; and front and rear covers 23 and 24 that cover the front and rear sides of the body basic portion 19.

A winding dial 28 is pivotally mounted atop the cartridge chamber 22 of the body basic portion 19, and is engaged with a spool 27 of a cartridge shell 26. On a top side of the winding dial 28 is formed an engaging hole 29, in which the winding knob 6 mounted on the casing 4 is engaged. The engaging hole 29 is exposed through the opening 12 that is formed through the front cover 23. It is to be noted that the opening 12 is provided in the place of a shutter button that is provided in a front cover of a standard lens-fitted photo film unit. The shutter mechanism 21 of the exposure unit 22 is exposed through the shutter lever opening 11 that is formed through the front of the front cover 23.

The film unit body 3 substantially has the same configurations as the unit body of the standard lens-fitted photo film unit, except that the front cover 23 and the winding dial 28 are specific for the waterproof type.

As shown in FIG. 2, the casing 4 consists of a case main body 3 that covers the front, top, bottom and opposite sides of the film unit body 3, and a lid member 33 that is mated to the case main body 32 from the rear of the film unit body 3 in a watertight fashion. The rear side of the case main body 32 forms an opening for accepting the film unit body 3, and a ridge 38 is integrally formed around the entire circumference of the opening 37.

The case main body 32 consists of a transparent resin layer 32a formed from a transparent rigid resin and an opaque resin layer 32b formed from an opaque rigid resin, which are integrally formed by two-color injection molding. The opaque resin layer 32b is formed to cover the outside of the transparent resin layer 32a except the photographic window 9 and the look-in window 10, so the transparent resin layer 32a is exposed in those parts corresponding to the photographic window 9 and the look-in window 10. Although the transparent resin layer 32a and the opaque resin layer 32b are shown separately from each other in FIG. 2, in order to show the configuration of the case main body 32 apparently, the transparent resin layer 32a and the opaque resin layer 32b are tightly joined to each other as an integral part by two-color injection molding. The transparent resin layer 32a of the case main body 32 is produced from a highly transparent new resin material. As an exemplary of the transparent rigid resin that is used as the material of the transparent resin layer 32a, general purpose polystyrene (GPPS) may be used. In that case, it is preferable to use a compound of general purpose polystyrene and pigments or dyes or the like, as the opaque rigid resin for use as the material of the opaque resin layer 32b. Because the transparent resin layer 32a and the opaque resin layer 32b are both formed from the general purpose polystyrene that is a rigid resin, it comes to be possible to reproduce the opaque resin layer 32b from a resin material that is obtained by melting the case main body 32 after it is used up and collected.

It is possible to form the case main body 32 using a semi-transparent resin layer instead of the opaque resin layer 32b. In that case, light permeable pigments may be added to the general purpose polystyrene, or the amount of pigments is reduced in comparison with the opaque resin layer. Combination of the transparent resin and the semi-transparent resin makes it possible to manufacture an attractive casing that keeps up with the latest trend of semi-transparent design.

It is also possible to form the opaque or semi-transparent resin layer from high-impact polystyrene (HIPS) that is a resin formed by adding butadiene as an elastic material to GPPS. Thereby the strength of the case main body 32 is raised. Since the HIPS cannot be transparent, it is impossible to use it as the material of the transparent resin layer 32a.

The lid member 33 is formed from a transparent plastic, preferably the same resin material as the transparent resin layer 32a. According to the present embodiment, the lid member 33 is formed from transparent GPPS. According to this configuration, the finder objective window 14 is observable from outside through the rear casing member 33. The lid member 33 has a recessed portion 64 formed around the entire circumference thereof on the front side thereof, so the recessed portion 64 is force-fitted on the ridge 38 of the opening 37 of the case main body 32. A rubber ring 69 is put in the recessed portion 64, for keeping the case main body 32 and the lid member 33 watertight.

A pair of engaging legs 67 are provided on the front side of the lid member 33 in either horizontal side thereof, each engaging leg having an engaging hole 66. These engaging legs 67 are engaged with engaging hooks (not shown) that are formed on inside of side walls of the case main body 32. Thereby, the lid member 33 is affixed to the case main body 32.

A cylindrical boss 40 is formed to protrude forward on the front side of the case main body 32, for pivotally bearing the shutter lever 5. Inside the boss 40 is formed a hole 41 that is connected to the inside of the casing 4, and a shaft 43 formed on the rear side of the shutter lever 5 is pivotally inserted in the hole 41 of the boss 40. An O-ring 42 with a small diameter is put in the hole 41 of the boss 40, for preventing water and dust and the like from entering inside the casing 4 through the hole 41.

After the shaft 43 of the shutter lever 5 is inserted in the hole 41 of the boss 40, a release lever 44 is affixed to a tip of the shaft 43. When the film unit body 3 is contained in the case main body 32, the release lever 44 is inserted in the opening 11 that is formed on the front of the front cover 23, so the release lever 44 is engaged with the shutter mechanism 21 of the exposure unit 22. Thereby, the shutter mechanism 21 inside the film unit body 3 is activated by operating the shutter lever 5 to swing in a counterclockwise direction in the drawings. A coiled spring 45 is mounted on the outer periphery of the boss 40. The coiled spring 45 urges the shutter lever 5 in a clockwise direction in the drawings, to reset the shutter lever 5 to its initial position at any time.

On the top side of the case main body 32 is formed an upward protruding cylindrical boss 47, for pivotally bearing the winding knob 6. Inside the boss 47 is formed a hole 48 that is connected to the inside of the casing 4, and an O-ring 49 with a large diameter is put in the hole 48 of the boss 47, for preventing water and dust and the like from entering inside the casing 4 through the hole 48.

The winding knob 6 consists of an operating portion 51 of a saucer-like shape with knurls formed around its outer periphery, and a drive shaft 52 formed on the bottom side of the operating portion 51. The drive shaft 52 is inserted in the hole 48 of the boss 47, and is engaged in the engaging hole 29 of the winding dial 28 through the opening 12 that is formed through the front cover 23 of the film unit body 3.

Accordingly, rotating the winding knob 6 in the counterclockwise direction in the drawings causes the winding dial 28 of the film unit body 3 to rotate in the same direction, thereby winding the exposed photo filmstrip into the cartridge shell 26. Although it is not shown in detail in the drawings, a claw member is formed on an outer peripheral surface of the drive shaft 52, and is engaged with an inner wall surface of the case main body 32 when the drive shaft 52 is inserted in the hole 48 of the boss 47, so the winding knob 6 may not slip out of the case main body 32.

A claw member 54 is pivotally mounted under the winding knob 6, such that the claw member 54 is actuated in cooperation with the winding knob 6 being rotated. When the winding knob 6 is rotated in a film winding direction that is the counterclockwise direction in the drawings, the claw member 54 clicks into engagement with ratchets formed inside the operating portion 51 of the winding knob 6. When a rotational force is applied to the winding knob 6 in the clockwise direction in the drawings, the claw member 54 is interlocked with the ratchets of the operating portion 51, thereby to stop the winding knob 6 from rotating in reverse.

Figure 4:
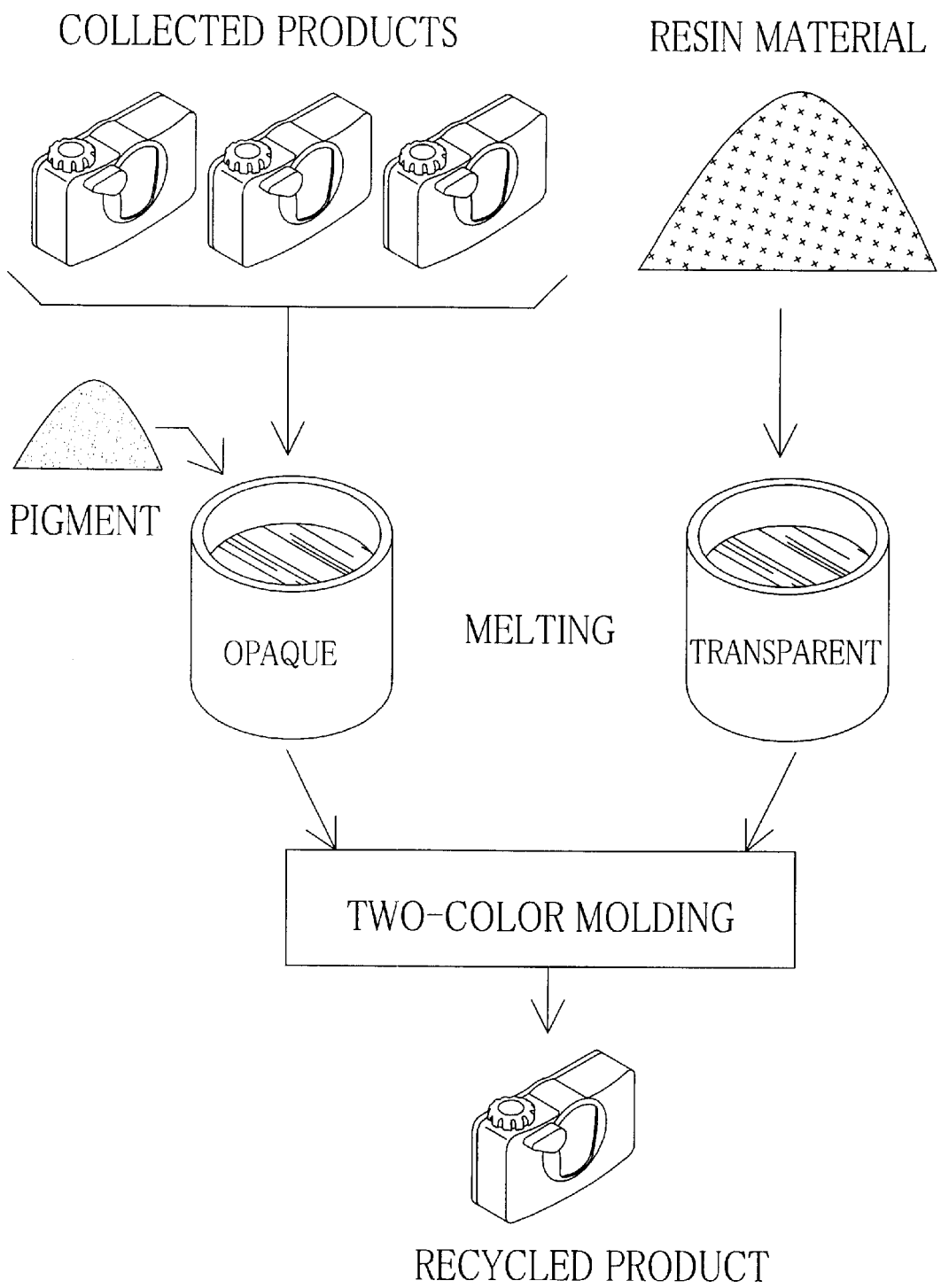
FIG. 4 is an explanatory diagram illustrating an example where the recycling method of the present invention is applied to a casing of a waterproof lens-fitted photo film unit.

Next, a recycling method of the casing 4 of the above embodiment will be described with reference to FIG. 4.

The casing 4 of the present invention, that is manufactured by two-color injection molding, is collected after it is used up, and is melted without separating the transparent resin layer 32a from the opaque resin layer 32b, in order to recycle it as a material of the opaque resin layer 32b when a case main body 32 is newly manufactured.

Since the transparent resin layer 32a and the opaque resin layer 32b are melted together, the density of the pigments, that is contained in the opaque resin layer 32b, is lowered from the original pigment density of the opaque resin layer 32b by adding the transparent GPPS, that constitutes the transparent resin layer 32a. So the pigments are added to make up for the shortage of the pigments while melting the collected products, so as to correct the pigment density to the original value of the opaque resin layer 32a.

The opaque resin material obtained from the collected casings 4 is formed in pellets and, thereafter, put as the resin material of the opaque resin layer 32b in a two-color injection molding machine. As the resin material for forming the transparent resin layer 32a, a new transparent GPPS is used at that time. In this way, the case main bodies 32 are manufactured as two-color formed products. Separately from the case main bodies 32, the lid members 33 are formed from the transparent GPPS.

Thereafter, the film unit body 3 is put in the two-color formed case main body 32, and the lid member 33 is mated, and then the winding knob 6 and the shutter lever 5 are mounted, completing the waterproof type lens-fitted photo film unit 2.

The case main body 32 as consisting of the transparent resin layer 32a and the opaque resin layer 32b, may be melted to be reproduced as a semi-transparent resin material after the case main body 32 is collected, in order to reuse it for two-color forming of a casing that uses a semi-transparent resin layer instead of the opaque resin layer 32b. In that case, pigments or dyes or the transparent resin material is added in accordance with a desirable density of the semi-transparent resin. Also in a case where the casing formed from the transparent resin layer and the semi-transparent resin layer by two-color forming is melted to be recycled as a resin material for a semi-transparent or opaque resin layer, it is necessary to add pigments or dyes in accordance with a desirable density of the semi-transparent or opaque resin.

When melting those main case body 32 where the opaque resin layer is made of high impact polystyrene (HIPS), the density of butadiene rubber is reduced by GPPS that constitutes the transparent resin layer 32a. So it is preferable to add butadiene rubber concurrently with pigments, for enforcing the elasticity of the opaque resin layer and thus obtaining a sufficient strength of the reproduced case main body.

As the two kinds of rigid resins used for the two-color molding, not only the above mentioned general purpose polystyrene (GPPS) and high impact polystyrene (HIPS), but also other resins may preferably be used insofar as they are chemically or physically equal or similar to each other, like they have equal or similar chemical structures, or their melting points or relative densities are equal or similar to each other. As examples of those materials, acrylonitrile-styrene resin (AS resin), acrylonitrile-butadiene-styrene resin (ABS resin), polycarbonate (PC) may be referred to.

Industrial Application Field

The present invention is preferably applicable not only to the above described waterproof casing for the waterproof type lens-fitted photo film unit, but also equally preferably applicable to casings for the standard lens-fitted photo film units or those for compact cameras. The present invention is not limited to casings for cameras, but may be generally applicable to recycling of those casings which are formed from plastics by two-color injection molding.

What is claimed is:

1. A casing for a camera that contains the camera and allows a user to operate the camera from outside the casing, said casing comprising a front cover and a rear cover, said front cover comprising:

transparent portions located in front of at least those parts of the camera which need to be exposed to external light; and non-transparent portions covering other parts of the camera, wherein the transparent portions and the non-transparent portions are formed respectively from a transparent rigid resin and non-transparent rigid resin by two-color injection molding, the transparent rigid resin and the non-transparent rigid resin differing from one another only with respect to at least one of a pigment and a dye present in the non-transparent rigid resin.

2. A casing for a camera as claimed in claim 1, characterized in that:

the transparent rigid resin and the non-transparent rigid resin have equal or similar physical and chemical properties to each other.

3. A casing for a camera as claimed in claim 1 characterized in that:

the casing is a casing for a lens-fitted photo film unit that is previously loaded with a photo film and is to be collected after use.

4. The casing of claim 1, wherein the rigid resin is general-purpose polystyrene.

5. A method of recycling a casing for a camera that consists of transparent portions disposed in front of at least those parts of the camera which need to be exposed to external light and opaque or semi-transparent portions covering other parts of the camera, wherein the transparent portions and the opaque or semi-transparent portions are formed respectively from a transparent rigid resin and an opaque or semi-transparent rigid resin by two-color injection molding, characterized in that:

the casing as collected is melted without distinguishing the transparent rigid resin from the opaque or semi-transparent rigid resin, to be reproduced as an opaque or semi-transparent resin; and that the reproduced opaque or semi-transparent resin material is used as a material for the opaque or semi-transparent portions when forming the same casing newly by two-color injection molding.

6. A recycling method as claimed in claim 5, characterized by adding pigments, dyes or a transparent rigid resin to the reproduced rigid resin, for adjusting color density thereof.

* * * * *

UNITED STATES PATENT AND TRADEMARK OFFICE
CERTIFICATE OF CORRECTION

PATENT NO. : 6,567,614 B1
DATED : May 20, 2003
INVENTOR(S) : Negishi et al.

It is certified that error appears in the above-identified patent and that said Letters Patent is hereby corrected as shown below:

<u>Column 7, line 18 through Column 8, last line,</u>
Delete Claims 5 and 6, and replace with the following:

-- 5. The casing of claim 1, wherein the non-transparent rigid resin is translucent.

6. The casing of claim 1, wherein the non-transparent rigid resin is opaque. --

Signed and Sealed this

Thirty-first Day of August, 2004

JON W. DUDAS
*Director of the United States Patent and Trademark Office*